United States Patent [19]

Cooney et al.

[11] Patent Number: 4,624,436
[45] Date of Patent: Nov. 25, 1986

[54] AIRCRAFT ENGINE MOUNT

[75] Inventors: Daniel E. Cooney, Sparks, Nev.;
Russell D. Miller, Melbourne Beach, Fla.

[73] Assignee: Lear Fan Corp. (U.S.), Reno, Nev.

[21] Appl. No.: 231,667

[22] Filed: Feb. 5, 1981

[51] Int. Cl.[4] ........................................... F16M 13/00
[52] U.S. Cl. ........................................................ 248/555
[58] Field of Search .................. 248/202.1, 281.1, 486, 248/536, 554, 555, 556, 660, 661, 674, 603, 637; 312/21, 27; 244/54

[56] References Cited

U.S. PATENT DOCUMENTS

| 694,648 | 3/1902 | Jordan et al. | 248/660 |
|---|---|---|---|
| 1,852,927 | 4/1932 | Hall | 248/554 X |
| 2,343,426 | 3/1944 | Tyler | 248/555 |
| 2,637,516 | 5/1953 | Kessler | 248/536 |
| 2,969,715 | 1/1961 | Mosby | 248/486 |
| 3,031,929 | 5/1962 | Prutzman | 248/486 |
| 3,222,017 | 12/1965 | Bobo | 248/555 |

FOREIGN PATENT DOCUMENTS 450178  7/1948  Canada .................. 248/555

OTHER PUBLICATIONS

Learfan Propulsion System, Published by Society of Automotive Engineers Inc., 1980.

Primary Examiner—William H. Schultz
Attorney, Agent, or Firm—Lyon & Lyon

[57] ABSTRACT

An aircraft engine mount is disclosed which has removable struts attached between the front upper and lower portions of the engine and the airframe during servicing, and a front lower mount having a spherical bearing which permits the engine to pivot about a generally vertical axis at the front of the engine. A rear mounting ring attached to the engine is detachable from the airframe during servicing, accomplished by rotating the aft portion of the engine outward through an access door about an axis at the front of the engine. An angled load bearing pin attached to the rear portion of the engine supplements the rear mounting ring so as to transmit to the airframe the forward loads of the engine experienced during a crash.

20 Claims, 9 Drawing Figures

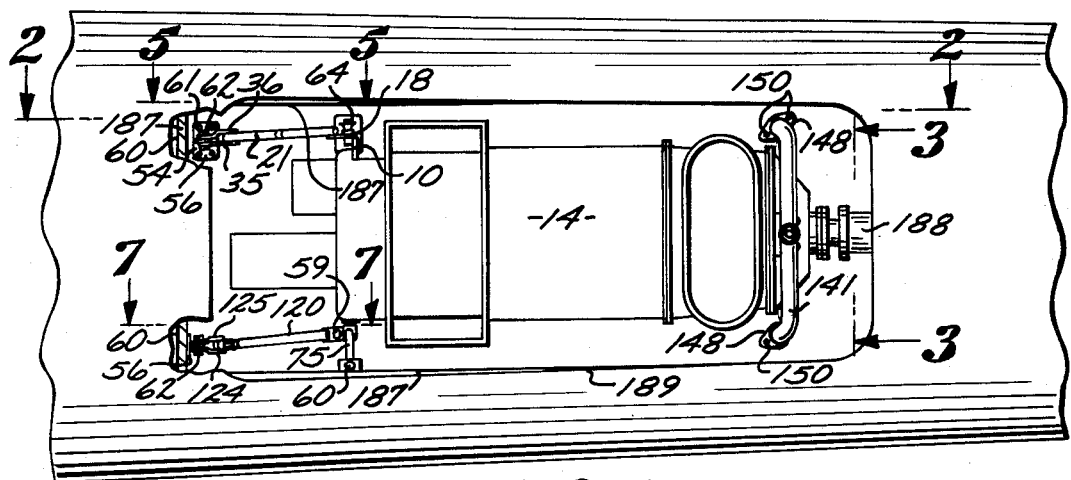
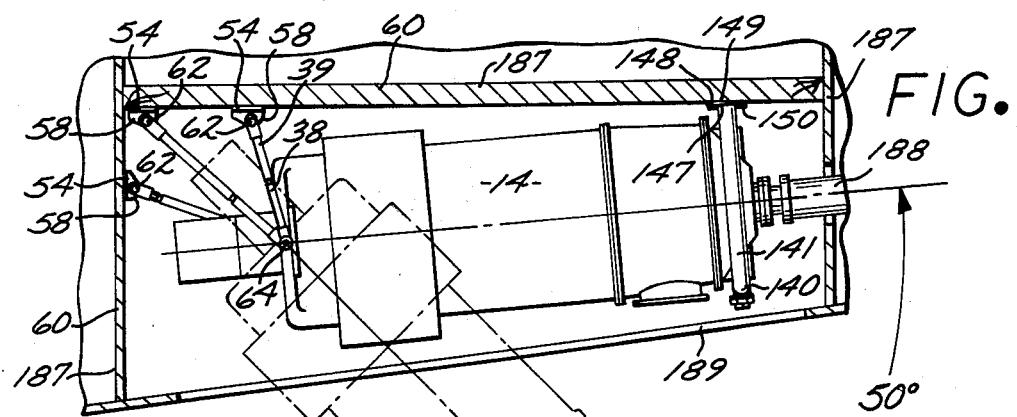
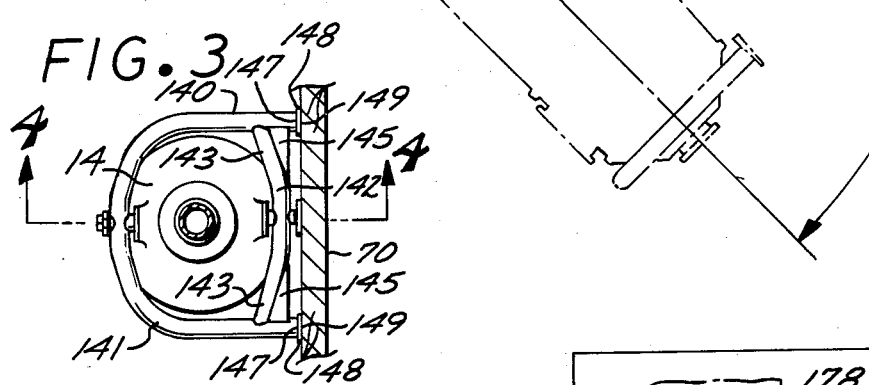
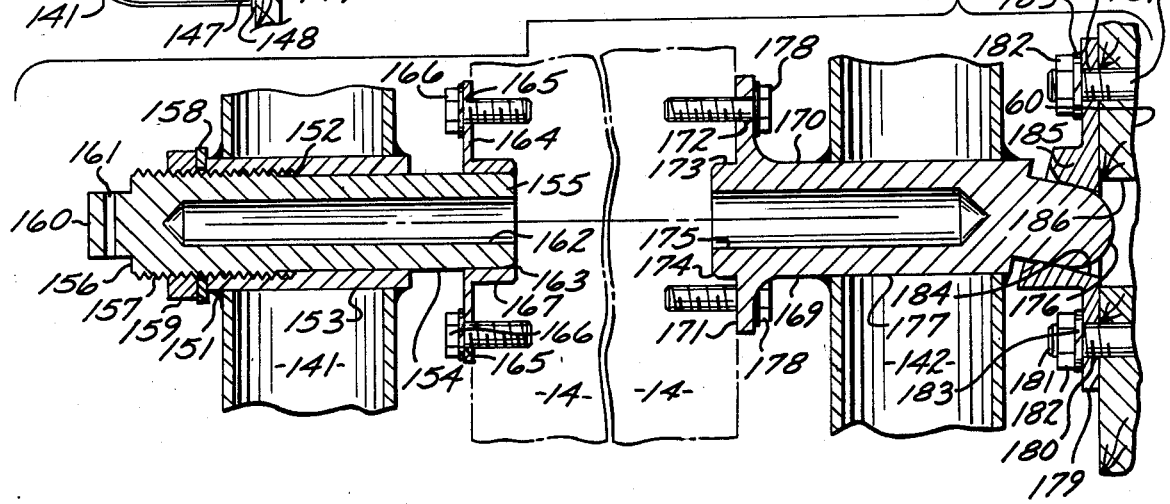

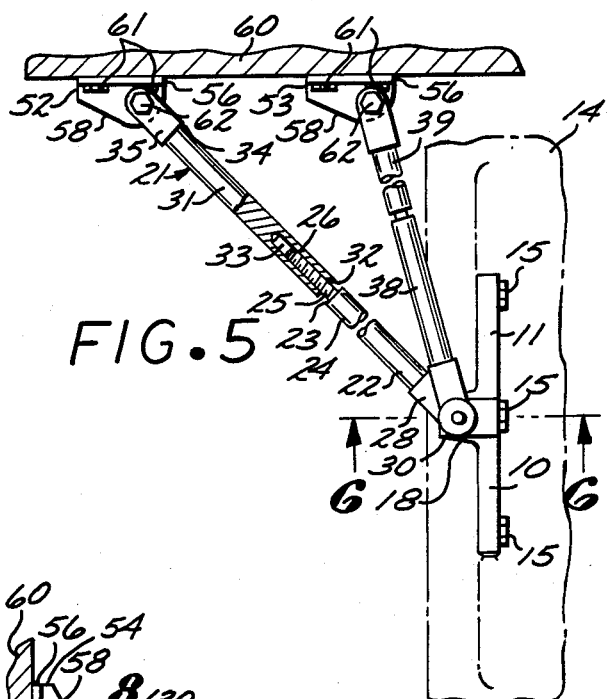
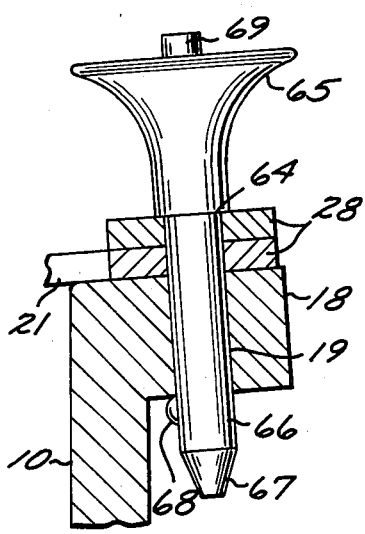
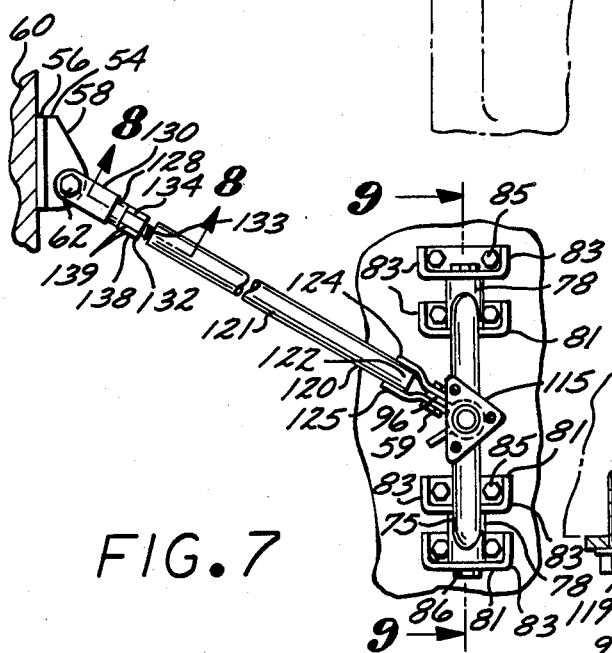
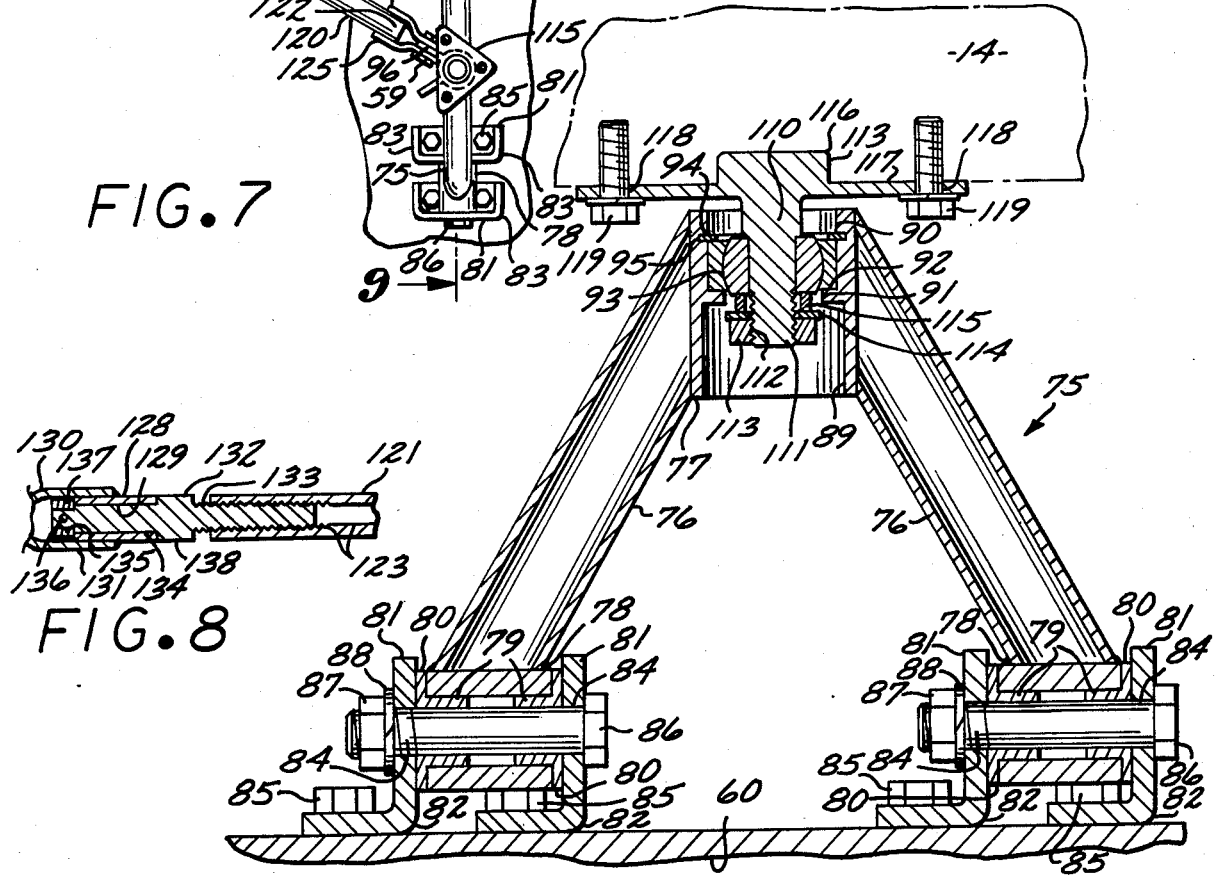
FIG. 5
FIG. 6
FIG. 7
FIG. 8
FIG. 9

AIRCRAFT ENGINE MOUNT

BACKGROUND OF THE INVENTION

1. Field of the Invention

The present invention relates to an aircraft engine mount and, more particularly, to an aircraft engine mount which permits the engine to be swung out of its normal operating position for servicing and inspection and which prevents the engine from moving from its normal operating position during a crash.

2. Description of the Prior Art

Aircraft engine mounts which act to transmit vertical, lateral, fore-aft and torque loads to the frame to which the engine is mounted, yet permit thermal expansion and contraction of the aircraft engine, have been known in the prior art for a long time. In addition, the general mechanical principles which form the basis for the design and operation of struts and other static support members are well described in standard textbooks of physics and mechanical engineering such as Merian, J. L. *Mechanics*, N.Y., John Wiley & Sons, 1956 and Kittel, C., Knight, W. D., Ruderman, M. A. *Mechanics, Berkeley Physics Course Vol. 1*, Newton, Mass., Education Development Center, 1968, reference to which is here by expressly made.

Despite the availability of a variety of aircraft mounts, there exists a need in the art for an improved engine mount which will faciliate complete, easy inspection and servicing of the engine, without requiring removal of the engine, yet still prevent the engine from breaking free during a crash.

SUMMARY OF THE INVENTION

In order to aid in the understanding of the present invention, it can be stated in essentially summary form that it is directed to an aircraft engine-to-airframe mounting where the rear of the aircraft engine may easily be swung out for inspection and servicing, yet is capable of remaining in its operating position during a crash. To this end, the front upper portion of the engine is attached to the airframe during servicing by removable means that, when attached, transmits fore-aft, lateral and torque loads of the engine to the airframe. Additionally, the front lower portion of the engine is attached to the airframe so as to transmit only vertical and lateral loads to the airframe. Additional removable means are attached to the airframe during servicing so that when attached, fore-aft loads of the engine are transmitted to the airframe and the engine is rotatable about a vertical axis. Also, the rear portion of the engine is removably attached to the airframe so that when attached, fore-aft, vertical, lateral and torque loads of the engine are transmitted to the airframe in such a manner the engine will remain fixed in the event of a crash.

It is an object of the present invention to provide an aircraft engine mount which permits the engine to be swung out of normal operating position for easy inspection and service.

It is another object of the present invention to provide an aircraft engine mount capable of maintaining the engine in its normal operating position during a crash.

It is still another object of the present invention to provide an aircraft engine mount having relatively few components.

Further objects and advantages of this invention will become apparent from a study of the following portion of the specification, the claims and the attached drawings.

BRIEF DESCRIPTION OF THE DRAWINGS

FIG. 1 is a side view looking inboard of an aircraft engine mounted in accordance with the present invention, immediately before being swung-out for servicing.

FIG. 2 top view of the aircraft engine, mounted in accordance with the present invention, immediately before being swung-out for servicing, with a phantom view of the engine in a swung-out configuration.

FIG. 3 is a rear view of a rear mount of the aircraft engine, mounted in accordance with the present invention.

FIG. 4 is a section of the rear mount taken along line 4—4 of FIG. 3.

FIG. 5 is a top view of a front upper mount assembly of the aircraft engine mounted in accordance with the present invention.

FIG. 6 is a section of the front upper mount assembly of the aircraft engine mounted in accordance with the present invention.

FIG. 7 is a top view of a lower strut assembly in accordance with the present invention.

FIG. 8 is a section of a lower strut taken along line 8—8 of FIG. 7.

FIG. 9 is a section of the front lower mount assembly taken line 9—9 of FIG. 7.

DESCRIPTION OF THE PREFERRED EMBODIMENT

The following specification, taken in conjunction with the drawings, sets forth the preferred embodiment of the present invention. The embodiment of the invention disclosed herein is the best mode contemplated by the inventors for carrying out their invention in a commercial environment, although it should be understood that various modifications can be accomplished within the parameters of the present invention.

The preferred embodiment contemplates the use of the present invention in an aircraft having two turbine engines, symmetrically placed with respect to the vertical centerplane of the fuselage. However, the present invention may be used in an aircraft having one or more engines, and these engines may be either turbine type or other types of aircraft engines. Thus, this description of a two turbine engine mount apparatus is exemplary only. In the following description, reference will be made to only one engine mount. The other engine mount in a two engine arrangement would be a mirror image with respect to the vertical centerplane.

During flight, each engine is attached to the aircraft's airframe by a rear mounting ring which is attached to and encircles the rear portion of the engine and is also attached to the airframe, serving to transmit vertical, lateral, fore-aft and torque loads of the engine to the airframe. The engine is also attached, during flight, to a front lower mount, which is in turn attached to the airframe so that vertical, lateral and torque loads of the engine are transmitted to the airframe. In addition, the front lower mount has a generally vertically mounted spherical bearing assembly and is movable in the fore-aft direction so as to permit fore-aft thermal expansion and contraction of the engine.

In order for ground maintenance to be performed on the engine, three struts which are used solely for maintenance purposes are installed. A lower strut is installed between the front lower mount and the airframe so that fore-aft loads of the engine are transmitted to the airframe. Two upper struts are attached between the airframe and a common pivot point on a front upper mount attached to the engine. This pivot point has an axis which generally coincides with the axis of the front lower mount. After the rear mounting ring is disconnected from the airframe, the three struts serve to support the engine while it is swung out for servicing. During swing-out the engine is primarily rotating on the lower mount bearing. When servicing is complete and the rear mounting ring is reattached, the three maintenance struts are removed. Upon reattachment of the driveshaft, the aircraft is then ready for flight.

Referring now to the drawings for a detailed description for the engine mounts and maintenance struts of the present invention, reference is made first to the front upper portion of an engine 14, as shown in FIG. 5. A front mount 10 having a generally arc-shaped bracket 11 is secured to the aircraft engine 14 by bolts 15. A tongue 18 projects generally perpendicularly from the plane of a bracket 10, and has a generally vertical hole 19 as more clearly shown in FIG. 6.

A first, relatively longer, upper strut 21 is seen generally in FIG. 5. The strut 21 has a male rod portion 22 with a cylindrical shoulder 23 separating a relatively larger diameter portion 24 from a relatively smaller diameter portion 25 having threads 26. The larger diameter portion 24 of male rod 22 rigidly attached, for instance by welding, to a tongue 28 which has a hole 29 in a rounded end 30, as more clearly shown in FIG. 6. A female rod portion 31 is bored and tapped on an end 32 with threads 33 so as to mate with the threads 26. End 34 of female rod 31 is attached to a flat tongue 35 and an S-shaped tongue 36, as seen more clearly in FIG. 1.

A second, relatively shorter upper strut 38 is seen generally in FIG. 5, the strut 38 having female rod portion 39. The sole difference between the first, longer upper strut 21 and the second, shorter upper strut 38 is the relative length of the female rods 31 and 39, respectively. Therefore, for the sake of brevity, the description of longer upper strut 21 will be adopted but not repeated with respect to shorter upper strut 38.

FIG. 5 shows a first upper strut bracket 52 and a second upper strut bracket 53, and FIG. 7 shows a lower strut bracket 54, each having a flat rectangular base portion 56 and an asymmetrical tongue 58 projecting perpendicularly from the base portion 56. The thickness of the tongue 58 is chosen so as to fit between the tongues 35 and 36 of the struts 21 and 38. The strut brackets 52, 53 and 54 are secured to the airframe 60 by bolts 61, as shown for instance in FIGS. 1 and 5, and the tongues 35 and 36 of upper struts 21 and 38 are removably attached to the upper strut brackets 52 and 53 by pivot pins 62.

As shown in FIG. 6, the tongues 28 of the upper struts 21 and 38 are removably and rotatably attached to the front upper mount 10 by a pivot pin 64, which has a flanged upper head 65, a shank portion 66, a tapered lower tip 67, a spring loaded retaining ball 68 and a release button 69.

Now turning attention to the front lower portion of the engine 14, FIG. 9 shows a front lower mount 75 generally in shape of an A-frame, with inclined side tubular members 76 attached to a cylinder 77 so that the axes of the side tubular members 76 are coplanar with the axis of the cylinder 77. The lower ends of the side tubular members 76 are attached to pivot tubes 78 so that the axes of the pivot tubes 78 coincide and are coplanar with the axes of the side tubular members 76, and are perpendicular to the axis of the cylinder 77. Inserted into each end of the pivot tubes 78 are bearings 79 having flanges 80. Brackets 81 are each formed by a right angular portion 82 and by triangular portions 83 attached perpendicularly to each end of the right angular portions 82, with one side of each of the right angular portions 82 having a hole 84. The brackets 81 are attached to the airframe 60 by bolts 85 so that the axes of the holes 84 coincide and form an angle of approximately 3° from normal with respect to the vertical centerplane of the aircraft. The acute angles formed by the right angular portions 82 each face inboard and are separated pairwise by the length of the pivot tubes 78 and flanges 80 of the bearings 79. The pivot tubes 78 are rotatably secured between pairs of the brackets 81 by bolts 86, nuts 87 and washers 88 through the holes 84.

As also seen in FIG. 9, the cylinder 77 is bored at a relatively larger diameter 89 through its lower portion, a relatively smaller diameter 91 through its central portion and an intermediate diameter 90 through its upper portion so that the central portion forms an annular shoulder 92. A spherical bearing 93 is located in the upper portion 91 and rests on the shoulder 92 while being fixed by a retaining ring 94 which fits into an annular slot 95.

As seen in FIG. 7, generally triangular tongue 96 of a thickness substantially equal to that of the tongues 58 is attached to the forward side of the cylinder 77 so that the tongue 96 is perpendicular to the axis of the cylinder 77 and forms an inboard angle of approximately 30° with respect to the vertical centerplane of the front lower mount 75.

FIG. 9 also shows a mounting pin 110 which has a shank portion 111 of a diameter permitting it to fit through the bearing 93. The shank portion has threads 112 by which the mounting pin 110 may be attached to the spherical bearing 93 by a nut 113, a washer 114 and a spacer tube 115 so that the mounting pin 110 may rotate about a generally vertical axis and also about horizontal and fore-aft axes to a lesser extent. On the opposite end of the shank portion 111 is a larger diameter portion 113, having a chamfer 116. A generally triangular plate 117 having holes 118 at each vertex is attached normally to the mounting pin 110, and the mounting pin 110 is attached to the engine 14 by bolts 119 through the holes 118.

A lower strut 120 is shown generally in FIG. 7. A first section 121 bored and tapped at 123 is more clearly shown in FIG. 8, and an end 122 is attached to S-shaped tongues 124 and 125. The tongues 124 and 125, each having a pivot hole (not shown), are separated by a gap wide enough to permit either the tongue 58 or the tongue 96 to be sandwiched in between the tongues 124 and 125. A second section 128, having a bore 129, is symmetrically attached to S-shaped tongues 130 and 131, each having a pivot hole (not shown), and the gap between the tongues 130 and 131 ideally the same as the gap between the tongues 124 and 125 so that lower strut 120 is endwise interchangable.

FIG. 8 depicts an intermediate rod 132 having a male threaded end 133 which mates with the threads 123, an unthreaded end 134 whose diameter permits it to fit into the bore 129, and a tip 135 on unthreaded end 134 of a relatively smaller diameter. The tip 135 has a hole 136 whose axis is perpendicular to the axis of the lower strut 120 so that when the end 134 is inserted into bore 129, a cotter pin (not shown) may be placed through the hole 136 to prevent separation of the parts of the lower strut 120. A central portion 138 of the intermediate rod 132 has a diameter larger than either of the ends, and has parallel flattened faces 139 which are separated by a distance which permits the use of an open-end wrench to adjust the length of the lower strut 120 by way of the threads 133. For lower strut 120 to be installed, either of its ends may be attached to the tongue 96 by a pivot pin 59, with the remaining end attached to the lower strut bracket 54 by one of the pivot pins 62.

Shifting attention to the rear portion of the aircraft engine 14, a rear mounting ring is seen generally in FIG. 3 at 140. A C-shaped tube 141 generally encircles the rear of the engine 14, with an inboard bracing tube 142, having angled ends 143 attached planarly near ends 144 of the C-tube 141. Triangular gussets 145 are attached to the tubes 141 and 142. mounting pads 148 are attached with an outboard face 147 normal to the ends of C-tube 141 and are of a generally oblong shape, as shown more clearly in FIG. 1.

As shown in FIG. 2, an inboard face 149 of the pads 148 makes an angle of approximately 3° with respect to the outboard face 147, with the thickest and the thinnest portions of the pads 148 defining a line normal to the plane of the C-tube 141, the thinnest portions being at the aft end. Thus, when the mounting ring 140 is attached, the axis of the airrcraft engine 14 makes an angle of approximately 3° with respect to the center line of the aircraft. The rear mounting ring 140 is removably attached to the airframe 60 by bolts 150 located near each end of the pads 148 and oriented normal to the face 149. The pads 148 are oriented with respect to the plane of the C-tube 141 so as to form a right angle from lines bisecting their respective bolts 150, as shown more clearly in FIG. 1.

FIG. 4 depicts an outboard insert tube 151 having threads 152 attached to the C-tube 141 through a hole 153 so that the axis of the tube 151 lies in the plane of the C-tube 141. An outboard engine mount pin 154 has an inboard end 155 whose outside diameter is substantially the same but less than the inside diameter of the outboard insert tube 151, and an outboard end 156 having threads 157 which are secured by a washer 158 and a nut 159, and mate with the threads 152 of the tube 151. A tip 160 of the outboard end 156 is formed to be a hexagonal head and is of a size permitting use of a standard wrench. A safety wire hole 161 appears in the tip 160 and is perpendicular to the axis of pin 154. A bore 162 extends from a chamfer 163 into the threaded section 157. An outboard pin mount socket 164 of generally trapezoidal shape has holes 165 at each vertex by which socket 164 is attached to engine 14 by bolts 166. A collar 167 is attached normally to the socket 164 and permits the inboard end 155 of the pin 154 to be inserted.

Also, as depicted in FIG. 4, an inboard engine mount pin 169 has a rod portion 170 attached normally to a generally trapezoidal plate 171 having holes 172 at each vertex. A tip 173, having a chamfer 174, projects through the plate 171 and is bored at 175. The other end of pin 169 forms a hemispherical tip 176 angled at approximately 12° from the axis of the pin 169, towards the relatively longer parallel side of the trapezoidal plate 171. The inboard engine mount pin 169 is oriented with the relatively longer parallel side of the trapezoidal plate 171 vertical, with the hemispherical tip 176 angled in the forward direction, towards the front of the engine 14. The inboard engine mount pin 169 is inserted through hole 177 in the C-tube 142 and is attached to the engine 14 by bolts 178. An engine mount pad 179 is of generally square shape, having holes 180 at each corner by which it is attached to the airframe 60 by studs 181, nuts 182 and washers 183, and also has a central hole 184 of a diameter larger than that of the hemispherical tip 176. A collar 185 is attached to the pad 179 at an angle towards aft of approximately 15° from normal to the vertical centerplane, and has an inside diameter which permits the hemispherical tip 176 to fit through the collar 185 and the central hole 184, and into a hole 186 in the airframe 60.

In the event of a crash, the engine 14 would be subjected to considerable force in the forward direction, however, this force is transmitted to the airframe 60 at several points, thereby permitting the engine 14 to remain in a firebox 187 formed by the airframe 60 on the fore, aft, inboard side, upper side and lower side of the engine and by an access door (not shown). First, the engine 14 is directly connected to the inboard engine mount pin 169, whose hemispherical tip 176 projects through the collar 185 of engine mount pad 179 into the hole 186 of the airframe 60. Thus, force on the engine 14 in the forward direction would be transmitted to the airframe 60 directly from inboard engine mount pin 169 and indirectly by way of engine mount pad 179. Further, any movement by the engine 14 and the inboard engine mount pin 169 in the forward direction would cause hemispherical tip 176 to move deeper into the hole 186 due to the forward angle of the tip 176 and rearward angle of the collar 185, thus providing an even more solid connection between the engine 14 and the airframe 60. Second, the engine 14 is connected to the outboard engine mount pin 154 so as to transmit forward forces to the rear mounting ring 140, and hence to the airframe 60, by way of the bolts 150 through the pads 148.

In order to utilize the swing away feature of the engine mount, thereby facilitating servicing of the rear portion of the engine, it is first necessary to install the longer and shorter upper struts 21 and 38 by way of the pivot pins 62 to the first and second upper strut brackets 52 and 53, and by way of two of the pivot pins 62 to the tongue 18. Similarly, the lower strut 120 is installed by the pivot pin 59 to the tongue 96, and to the lower strut bracket 54 by one of the pivot pins 62. FIGS. 1 and 2 show the struts 21 and 38 installed in this manner. Next, the rear portion of the engine 14 is disconnected from a driveshaft 188, and in a similar manner other disconnections may be made as required by the specific engine connections being utilized. The four bolts 150 which attach the rear mounting ring 140 to the airframe 60 are next removed. The engine is now ready to swing out of the firebox 187 by way of an engine service portal 189 through an angle of approximately 50°, as more clearly shown in FIG. 2.

The engine 14 is primarily supported by the front lower mount 75 and is allowed to rotate due to the spherical bearing 93. After the swing-out procedure and during servicing, the lower strut 120 prevents any fore-aft or lateral motion of the front lower mount 75. Similarly, the upper struts 21 and 38 prevent the engine 14 from moving laterally or in a fore-aft direction, and also prevent any rotation of the engine 14 except that about the axis of the spherical bearing 93.

It is noted that flexible fuel and oil lines remain connected during the swing out procedure as do hydraulic and electrical connections. When the engine 14 is in its swung out configuration, the servicing of the aft portion of the engine is greatly facilitated so that the fuel nozzle, igniter plugs, bleed valve hot sections are more easily accessible.

To move the engine 14 from its swung out configuration back into the firebox 187, the engine 14 is swung in through the service portal 189, the rear mounting 140 is reattached to the airframe 60 by the bolts 150, the driveshaft 188 is reconnected to the engine 14 and the upper struts 21 and 38, and the lower strut 120 are disconnected and removed. The engine 14 is thus mounted for flight.

The present invention having been described in its preferred embodiment, it is clear that it is susceptible to numerous modifications and embodiemnts within the ability of those skilled in the art and without the exercise of the invention faculty. Accordingly, the scope of the present invention is defined by the scope of the following claims.

What is claimed is:

1. An apparatus for mounting an aircraft engine to an airframe, comprising:
    means for connecting the engine to the airframe, the connecting means adapted to permit pivotal movement of the engine from a first position to a second position;
    means attached to the engine for selectively maintaining the engine in the first position;
    the connecting means including:
    a mount, the mount being pivotably attached to a first portion of the engine, the mount operative to maintain the first position of the engine substantially proximate to the airframe when the engine is in the first or the second position, the mount further adapted to permit a second portion if the engine to be pivoted through a defined angle to place the engine in the second position;
    strut means operative with the mount to support the engine for atriculated movement from the first position to the second position.

2. An apparatus for mouting an aircraft engine to an airframe, as defined in claim 1, wherein the maintaining means comprises:
    a substantially semi-circular tube;
    means for attaching the tube to the airframe to selectively maintain the engine in the first position;
    means for attaching the tube to the engine to selectively maintain the engine in the first position.

3. An apparatus for mounting an aircrift engine to an airframe to permit pivoting of the engine, comprising:
    a mount;
    means for attaching said mount to the engine and to the airframe;
    a strut;
    means for attaching the strut to the engine and to the airframe;
    a mounting ring;
    means for attaching the mounting ring to the engine and to the airframe;
    means integral with the mount and adapted to permit pivoting of the engine from a first position to a second position.

4. An apparatus for mounting an aircraft engine to an airframe, as defined in claim 3, wherein the strut comprises:
    a first strut;
    means for attaching the first strut to the engine and to the airframe;
    a second strut;
    means for attaching the second strut to the engine and to the airframe.

5. An apparatus for mounting an aircraft engine to an airframe, as defined in claim 4, which includes:
    a third strut;
    means for attaching the third strut to the mount and to the airframe.

6. An apparatus for mounting an aircraft engine to an airframe, as defined in claim 3, wherein the mounting ring comprises:
    a tube disposed about a portion of the engine;
    means for attaching the tube to the airframe;
    a second tube;
    means for attaching the second tube to the tube;
    whereby a portion of the engine is disposed between the tube and the second tube.

7. Apparatus for mounting an aircraft engine to an airframe, as defined in claim 1, wherein the mount comprises:
    a main body portion;
    a cylinder attached to a top portion of the main body portion, the cylinder having an axis of rotation;
    means for attaching the cylinder to the engine so that the engine is pivotable about the axis of rotation of the cylinder;
    means for attaching the main body portion to the airframe.

8. Apparatus for mounting an aircraft engine to an airframe, as defined in claim 7, wherein the main body portion comprises:
    two inclined tubular members, one end of each attached to the cylinder so as to form an acute angle with the axis of the cylinder bisecting the angle;
    two pivot tubes, each attached to the unattached end of one of the inclined tubular members so that the axes of the pivot tubes coincide, the pivot tubes attached to the airframe.

9. Apparatus for mounting an aircraft engine to an airframe, as defined in claim 8, wherein:
    the cylinder contains a bearing mounted coaxially inside the cylinder;
    the means for attaching the cylinder to the engine comprises a mounting pin inserted into the bearing, the mounting pin attached to the engine.

10. An apparatus for mounting an aircraft engine to an airframe to permit pivoting of the engine, comprising:
    means for pivotably attaching a lower front portion of the engine to the airframe;
    means for pivotably attaching an upper front portion of the engine to the airframe;
    means for selectively attaching a rear portion of the engine to the airframe;
    the lower front portion attaching means and the upper front portion attaching means adapted to permit pivotal movement of the rear portion of the engine from a first position wherein the rear portion of the engine is substantially proximate to the airframe to a secodd position wherein the rear portion of the engine is pivoted a preselected distance from the airframe.

11. An apparatus for mounting an aircraft engine to an airframe, as defined in claim 10, wherein the means for pivotably attaching the lower front portion of the engine to the airframe includes a lower front mount attached pivotably about a generally vertical axis to the engine and pivotably about a generally horizontal axis to the airframe.

12. An apparatus for mounting an aircraft engine to an airframe, as defined in claim 11, wherein the lower front mount comprises:
a main body portion;
a cylinder attached to a top portion of the main body portion so that the axis of the cylinder is generally vertical;
means for attaching the cylinder to the engine so that the engine is pivotable about the axis of the cylinder;
means for attaching the main body portion to the airframe.

13. An apparatus for mounting an aircraft engine to an airframe, as defined in claim 12, wherein the main body portion comprises:
two inclined side tubular members, one end of each attached coplanarly and symmetrically to the cylinder so as to form an acute angle with the axis of the cylinder bisecting the angle:
two pivot tubes, each attached coplanarly and symmetrically to the unattached end of one of the inclined side tubular members so that the axes of the pivot tubes coincide.

14. An apparatus for mounting an aircraft engine to an airframe, as defined in claim 13, wherein:
the cylinder further comprises a spherical bearing mounted coaxially inside the cylinder;
the means for attaching the cylinder to the engine comrises a mounting pin of a diameter permitting it to be inserted through the spherical bearing and attached normally to a lower front portion of the engine.

15. An apparatus for mounting an aircraft engine to an airframe, as defined in claim 10, wherein the means for pivotably attaching the upper front portion of the engine to the airframe comprises:
an upper front mount;
means for pivotably attaching the upper front mount to the engine;
said upper front mount adapted to permit articulated movement of the engine from the first position to the second position.

16. An apparatus for mounting an aircraft engine to an airframe, as defined in claim 15, wherein the front upper mount comprises:
a first upper strut;
means for pivotably attaching an outboard end of the first upper strut to the engine;
means for attaching an inboard end of the first upper strut to the airframe;
a second upper strut;
means for pivotably attaching an outboard end of the second upper strut to the engine;
means for attaching an inboard end of the second upper strut to the airframe.

17. An apparatus for mounting an aircraft engine to an airframe, as defined in claim 16, wherein the first and second upper struts are removable.

18. An apparatus for mounting an aircraft engine to an airframe as defined in claim 10, further comprising:
a lower strut;
means for attaching a forward end of the lower strut to the airframe;
means for attaching an aft end of the lower strut to the lower front mount.

19. An apparatus for mounting an aircraft engine to an airframe, as defined in claim 19, wherein the lower strut is removable.

20. An apparatus for mounting an aircraft engine to an airframe, as defined in claim 10, wherein the means for pivotably attaching the lower front portion of the engine to the airframe comprises:
a lower front mount;
means for pivotably attaching the lower front mount to the engine;
the lower front mount adapted to permit articulated movement of the engine from the first position to the second position.

* * * * *